United States Patent [19]
Ja

[11] Patent Number: 6,018,604
[45] Date of Patent: Jan. 25, 2000

[54] OPTICAL ISOLATOR USING A BEAM APERTURE METHOD

[75] Inventor: Yu Hong Ja, San Jose, Calif.

[73] Assignee: Ja Laboratories, Inc., San Jose, Calif.

[21] Appl. No.: 09/084,295

[22] Filed: May 26, 1998

[51] Int. Cl.$^7$ .................................................. G02B 6/32
[52] U.S. Cl. ............................... 385/34; 385/33; 385/43; 385/27
[58] Field of Search ................................. 385/34, 33, 35, 385/43, 27; 372/703

[56] References Cited

U.S. PATENT DOCUMENTS

| | | | |
|---|---|---|---|
| 4,744,620 | 5/1988 | Ueno et al. | 385/34 |
| 5,457,759 | 10/1995 | Kalonji et al. | 385/31 |
| 5,699,464 | 12/1997 | Marcuse et al. | 385/33 |

*Primary Examiner*—Phan T. H. Palmer

[57] ABSTRACT

This invention proposes the fabrication of a polarization-independent fiber optic (in-line) isolator based on a beam aperture method. A micro Grin lens and a small Grin lens are used. They function as the collimators for the forward-going and the backward-going beams from the input and output ends of the isolator, respectively. In addition, the small Grin lens also acts as a beam expander for the backward-going beam. Due to the different apertures of the collimated beams, the optical power of the forward-going beam is almost completely collected by the optical fiber at the output end, whereas only a very small percentage of the optical power of the backward-going beam is collected by the micro Grin lens and the attached input fiber. Because the beam is usually a Gaussian, placing the micro Grin lens at an off axis position will significantly enhance the isolation of the isolator. Two-stage isolators whose basic structure consists of two tandem single-stage isolators can also significantly enhance the isolation of the same.

20 Claims, 6 Drawing Sheets

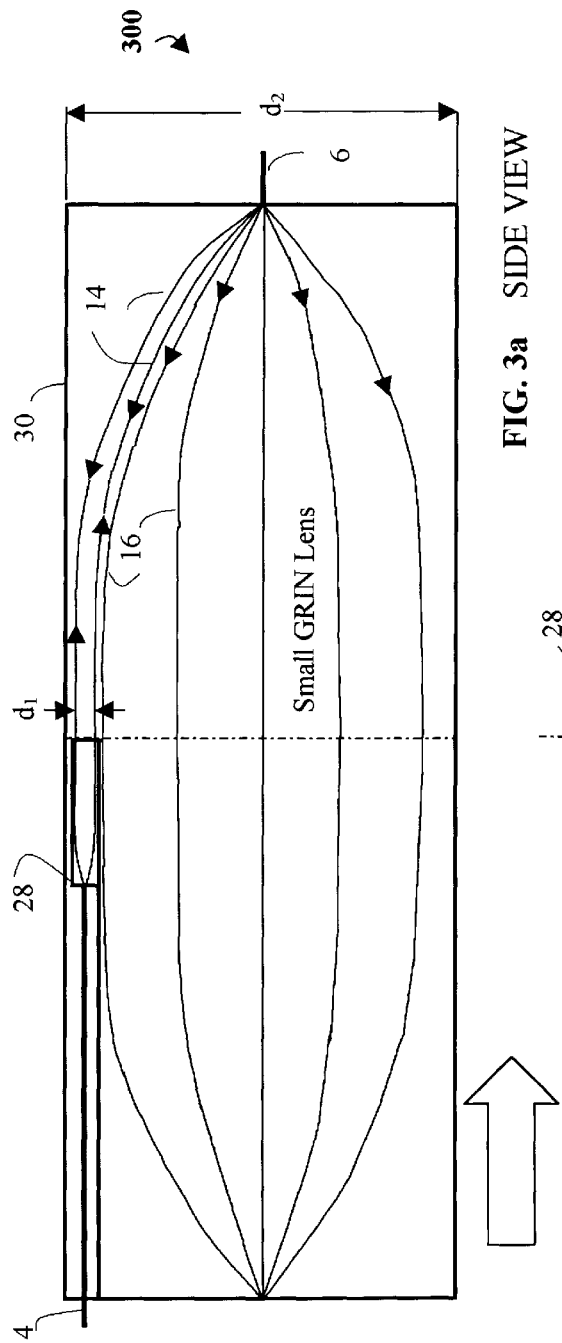
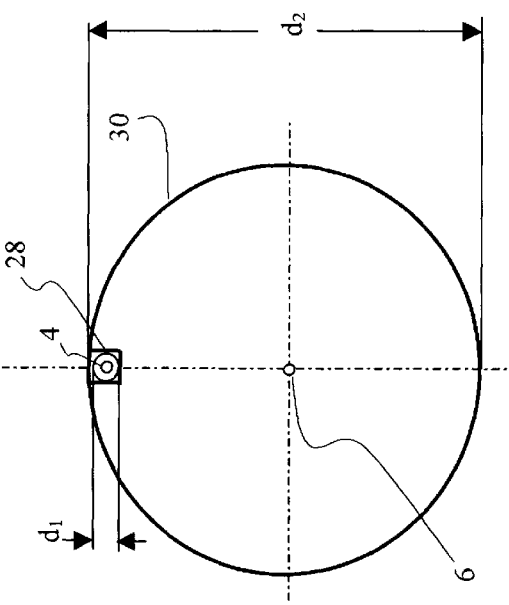
FIG. 3a SIDE VIEW
FIG. 3b CROSS-SECTIONAL VIEW

OPTICAL ISOLATOR USING A BEAM APERTURE METHOD

BACKGROUND OF THE INVENTION

1. Field of the Invention

This invention relates generally to fiber optic components, and in particular to a polarization-independent in-line isolator utilizing a beam aperture and/or an offset beam aperture method.

2. Description of Related Art

Optical isolators are one of the most important passive components in telecommunications, optical sensing and related technologies. The function of an optical isolator is to let a light beam pass it in one direction, that is, the forward direction only (like a one-way traffic). The isolator dramatically suppresses the light propagating in the backward direction.

The current polarization-independent fiber optic (in-line) isolator is based on the Faraday effect, which is one of the most commonly used nonreciprocal effects. The key part (sometimes called the core) of a stage of the art fiber optic isolator consists of a Faraday single crystal (for example, Garnet), a hollow magnet and two birefringent crystals (for example, $LiNbO_3$). The Faraday crystal is placed inside the hollow magnet and between these two birefringent crystals. Collimated beams are usually required as incident beams for the core from the forward and backward directions. Hence, a fiber collimator comprising basically a fiber and a Grin (graded index) lens is used at the input and output ends of the isolator.

The forward-going beam from the input fiber, upon impinging on the first birefringent crystal, becomes two spatially separated beams (the ordinary and extraordinary beams with orthogonal polarization vectors, that is, the O-beam and the E-beam) due to the birefringence. After passing the Faraday crystal and the second birefringent crystal, these two beams are paralleled to each other and therefore fully collected by the second collimator. However, the O-beam and the E-beam of the backward-going beam emerging from the first birefringent crystal, become divergent due to the nonreciprocal Faraday effect. They cannot be collected by the first collimator. Thus, the function of an isolator (to suppress the backward-going beam) is realized. The structure of such an isolator is quite complicated, and accurate optical alignments between these parts are required. The high cost of the core and labors leads to a relatively expensive isolator.

There is therefore an urgent need for another type of fiber optic isolator that significantly reduces the number of components, resulting in a simpler structure, a faster assembly time, lower cost, higher reliability and improved performance.

BRIEF SUMMARY OF THE INVENTION

This invention presents a new type of polarization-independent in-line fiber isolator based on an offset beam aperture method. The main parts of the isolator include an input (single mode) fiber, a micro Grin lens (with a very small diameter, say 50 to 300 micrometers) and a small Grin lens (with a diameter of 2–8 millimeters), and an output (single mode) fiber. The two Grin lenses function as the collimators for the forward-going and the backward-going beams from the input end and the output end, respectively. Because the distance between the input fiber and the micro Grin lens is much smaller than that between the output fiber and the small Grin lens (or because the length of the micro Grin lens is much smaller than that of the small Grin lens), the width (aperture) of the collimated forward-going beam is much smaller than that of the collimated backward-going beam. Thus, the optical power of the forward-going beam will almost completely be collected by the output fiber, whereas only a very small percentage of the optical power of the backward-going beam is collected by the micro Grin lens and the attached input fiber. Compared with the current isolator using the Faraday effect, this isolator has fewer and simpler components, which lead to a simpler structure, a faster assembly time, lower overall cost, higher reliability and improved performance characteristics.

BRIEF DESCRIPTION OF THE DRAWINGS

The features of the present invention and the manner of attaining them will be apparent. The invention will be understood by reference to the following description and the accompanying drawings, wherein:

FIG. 3 is the schematic of another form of the in-line isolator shown in FIG. 2. The micro GRIN lens and the attached input fiber are at an off-axis position and placed inside a narrow slot in the small Grin lens.

Similar numerals refer to similar elements in the drawings (FIG. 1–FIG. 8). Note that the drawings are not to scale and components in the figures are not in exact proportion. This is for easy explanation and visual clarity.

DETAILED DESCRIPTION OF THE INVENTION

Figure 1:
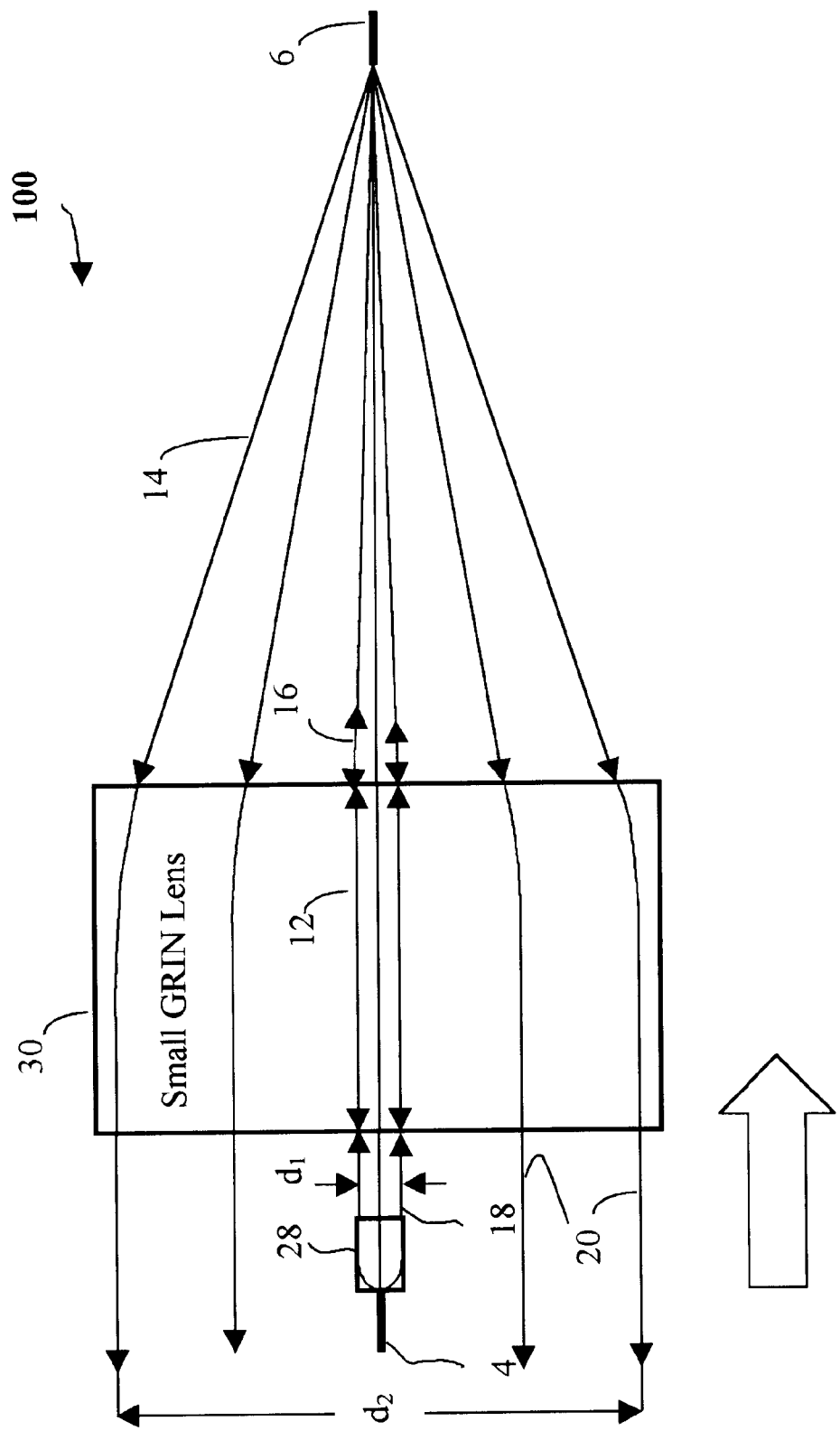
FIG. 1 is the schematic of a fiber optic in-line isolator according to the present invention. The micro GRIN lens at the input end of the isolator is at an on-axis position.

Because Grin lenses are the key components of the isolator, we first describe their basic properties. A Grin lens is a cylinder of dielectric material whose refractive index usually decreases in the radial direction (The refractive index reaches a maximum at the cylinder axis. In FIG. 1, the radial direction of the Grin lens is the vertical direction). The radial distribution of its refractive index is expressed as $$n(r) = n_0(1 - Ar^2/2), \qquad (1)$$

where $n_0$ is the maximum refractive index (at r=0, that is, at the axis), $A^{1/2}$ is the gradient constant and r is the radius of the Grin lens. A Grin lens with this refractive profile is called a SELFOL lens whose function is similar to a conventional convex lens. A Grin lens has the following advantages over a conventional convex or concave lens:

1) Low aberrations.
2) High focusing effect.
3) Convenience of mounting and alignment.

Due to these advantages, Grin lenses (especially SELFOL lenses) have taken the place of conventional lenses in the manufacture of most fiber optic components including in-line isolators, in-line circulators, filter wavelength division multiplexers (FWDMs), bandpass wavelength division multiplexers (BWDMs), etc.

FIG. 1 is the schematic side view of a polarization-independent in-line isolator 100 according to the present invention. The isolator 100 comprises micro Grin lens 28, small Grin lens 30, and fibers 4 and 6. The output end of the input fiber 4 is attached to the input surface of the micro Grin lens 28 whose pitch (P) is equal to 0.25 (the lens length is equal to $2\pi P/A^{1/2}$. The output fiber 6 is not attached to the small Grin lens 30 of 0.11 pitch (it can be attached to the small Grin lens 30, but then the pitch of the lens should be 0.25). The length of the micro Grin lens 28 should be much smaller than that of the small Grin lens 30. The two inward ends of fibers 4 and 6 (facing the micro Grin lens 28 and the small Grin lens 30) are placed at the focuses of the two Grin lenses 28 and 30, respectively. Therefore, the divergent backward-going beam consisting of beam bundles 14 and 16 will become a collimated beam 20 after passing the small Grin lens 30. So is the case for the forward-going beam, which becomes collimated beam 18 after passing the micro Grin lens 28. In other words, the micro Grin lens 28 and the small Grin lens 30 act as collimators for light beams emanating from the fibers 4 and 6, respectively.

Figure 2:
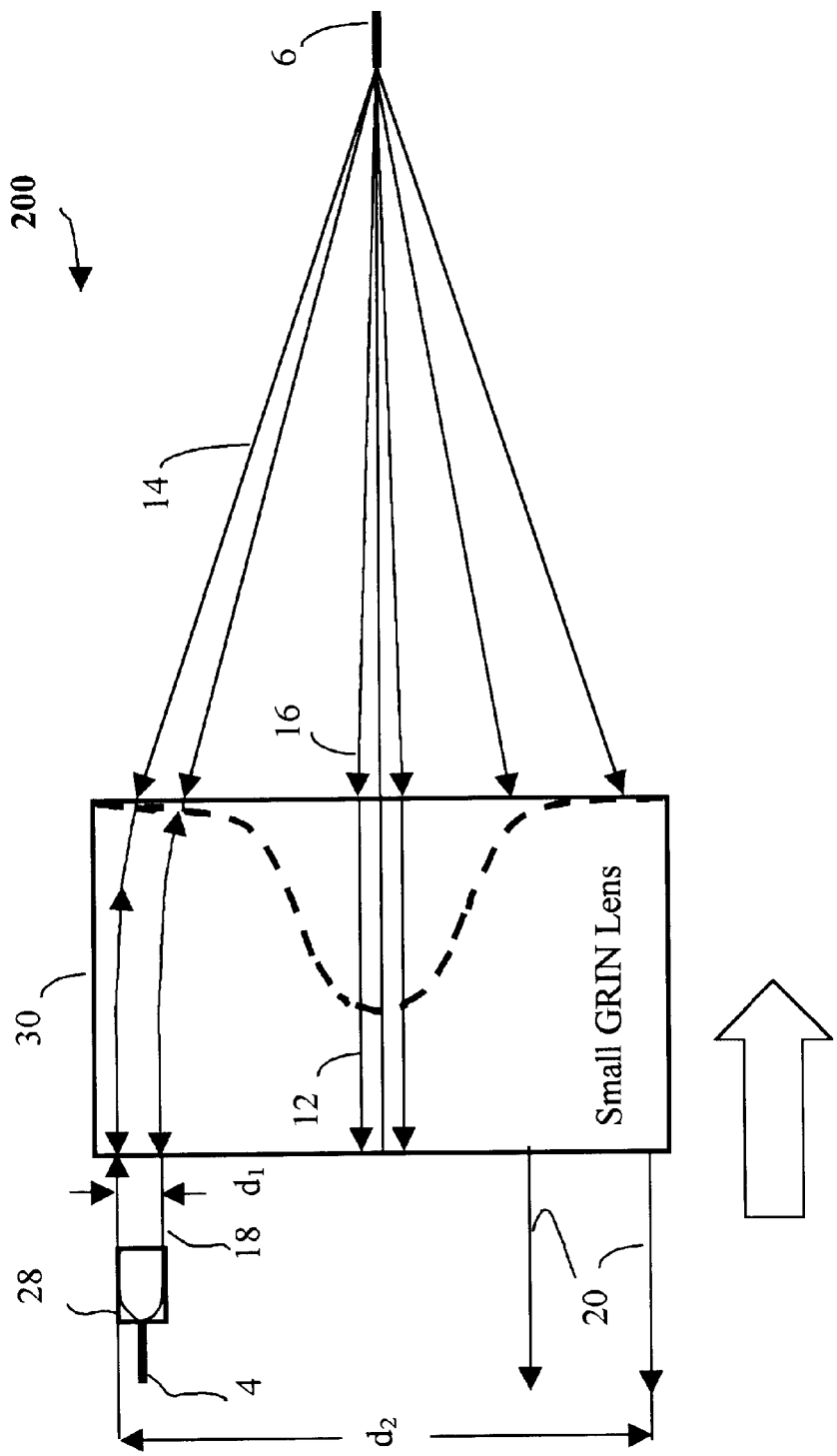
FIG. 2 is the schematic of the same fiber optic isolator as shown in FIG. 1, but with the micro GRIN lens (at the input end) at an off-axis position. In addition, the beam-intensity distribution of the backward-going beam over the aperture of the small Grin lens is depicted.

The fibers 4 and 6 are usually the same type. Therefore, their numerical apertures (NAs, that is, the half divergence angles of the beams emanating from these two fibers) are the same. And the distances between the fibers 4 and 6 and their corresponding lenses are different (the former is usually about 0–0.1 millimeters and the latter is about 15–20 millimeters). Consequently, the beam widths ($d_{1,2}$ in FIG. 1) of the collimated beams 18 and 20 at the output surfaces of the micro Grin lens 28 and the small Grin lens 30 are very much different. The forward-going beam 18 (or 12 or 16) will almost completely be intercepted by the fiber 6 at the output end, whereas only a very small percentage of the optical power of the backward-going beam 20 is collected by the micro Grin lens 28 and the attached input fiber 4. Note that the micro Grin lens 28 is at an on-axis position. To have a small insertion loss, the numerical aperture of the micro Grin lens 28 must be equal to or larger than that of the input fiber 4. The isolation (or backward loss) of the isolator 100 is given by $$\text{Iso}=10 \text{ Log}_{10}(P_2/P_1)=10 \text{ Log}_{10}[K(d_2/d_1)^2], \quad (2)$$

where $P_1$ is the total power of the backward-going beam 20, and $P_2$ is its power intercepted by the micro Grin lens 28 and $d_{1,2}$ are the diameters (beam widths or apertures) of the two collimated beams 18 and 20 (or approximately the diameters of the micro and small Grin lenses 28 and 30), respectively. The constant K=1 if the beam-intensity distribution in the radial direction is uniform. For a Gaussian beam-intensity distribution, K<1 with an on-axis micro Grin lens 28 (FIG. 1), and K>1 with an off-axis Grin lens 28 (FIG. 2). The isolation is in the unit of dB. One can see from FIG. 1 or FIG. 2 that to have an effective isolation, the diameter $d_2$ of the backward-going beam 20 must be very much larger than the diameter $d_1$ of the forward-going beam 18. With a uniform beam, $d_2$=8 mm and $d_1$=0.15 mm, the isolation will be about 30 dB if K≈0.87. In FIG. 1, the large block arrow represents the allowed propagating direction of the isolator, that is, the forward direction.

Another version of the fiber optic isolator 100 (FIG. 1), called isolator 200, is depicted schematically in FIG. 2. Since the backward-going beam (the collimated beam 20 or the beam bundles consisting of 14 and 16 in FIG. 2) emanating from the fiber 6 is essentially a Gaussian beam (see the broken curve shown in FIG. 2), placing the micro Grin lens 28 in an off-axis position (FIG. 2) will significantly enhance the isolation. In the off-axis position, the micro Grin lens 28 receives a smaller percentage of the collimated beam 20 than that in an on-axis position (FIG. 1). Depending on the offset of the micro Grin lens 28 and the real spatial intensity-distribution distribution of the collimated backward-going beam 20 which depends in turn on the waist of the Gaussian beam and the distance between the small Grin lens 30 and the output fiber 6, the isolation can increase by 3–15 dB (K>1 in Equation 2). For example, assuming the micro Grin lens 28 is placed at the position (near the edge of the small Grin lens 30) where the intensity of the output Gaussian beam drops by a factor $1/e^2$≈0.135 from its peak value on the beam axis, then K≈$e^2$=7.389 and the isolation will be 43 dB. It should be pointed out that the width of the Gaussian beam is slightly different at the input and output surfaces of the small Grin lens 30, due to the bending of the beam by the same lens and the non-zero lens length.

In practice, a Grin lens with a larger diameter can replace the micro Grin lens 28 shown in FIG. 1. This will make the fabrication of an isolator easier and may strengthen the isolator's mechanical structure. However, in this case, the length of this Grin lens should be much smaller than that of the small Grin lens 30. In addition, the outer area of the output surface of this Grin lens should be deposited with a light-diffusing layer to prevent the backward-going beam 20 from being reflected back to the output fiber 6.

FIGS. 3a and 3b are the schematic views of fiber in-line isolator 300 where FIG. 3a is the side view and FIG. 3b is the cross-section view. In FIG. 3a, the micro Grin lens 28 is also in an off-axis position.

The pitch of the small Grin lens 30 in FIG. 3a is equal to 0.5, while that of the small Grin lens 30 in FIG. 2 is about 0.11. As before, the pitch of the micro Grin lens 28 in FIG. 3a is equal to 0.25. The fibers 4 and 6 are attached to the input surface of the micro Grin lens 28 and output surface of the small Grin lens 30, respectively. Light emanating from the fiber 4 will become collimated at the output surface of the micro Grin lens 28 (FIG. 3a). Around the circumference of the Grin lens 30, a slot is cut from its input surface to its middle position. The slot has an approximately rectangular cross-section with a width of about 0.13 mm (FIG. 3b). When placing the micro Grin lens 28 into this slot and aligning its output surface with the middle position of the Grin lens 30 (at 0.25 pitch), beam 14 emanating initially from the fibers 4 and 6 will be focused into each other and becomes collimated at the middle position of the small Grin lens 30. Thus, the total power of the forward-going beam from the input fiber 4 will be collected by the output fiber 6, whereas most of the power (represented by the beam bundle 16 in FIG. 3a) of the backward-going beam from the output fiber 6 are lost and cannot reach the input fiber 4.

The diffraction of the input beam along its propagation path (inside and outside the small GRIN lens 30 shown in FIGS. 1–2 or inside the small GRIN lens 30 shown in FIG. 3) may defocus the beam. Thus, the spot size of the beam at the input face of the output fiber (fiber 6 in FIGS. 1–3) may be larger than the core diameter of the output fiber. Consequently some of the beam may not be intercepted by the output (single mode) fiber, resulting in a higher insertion loss. To reduce the insertion loss, a fiber taper whose cross-sectional view is shown in FIG. 4 is needed in stead of the output fiber 6 shown in FIGS. 1–3.

Figure 4:
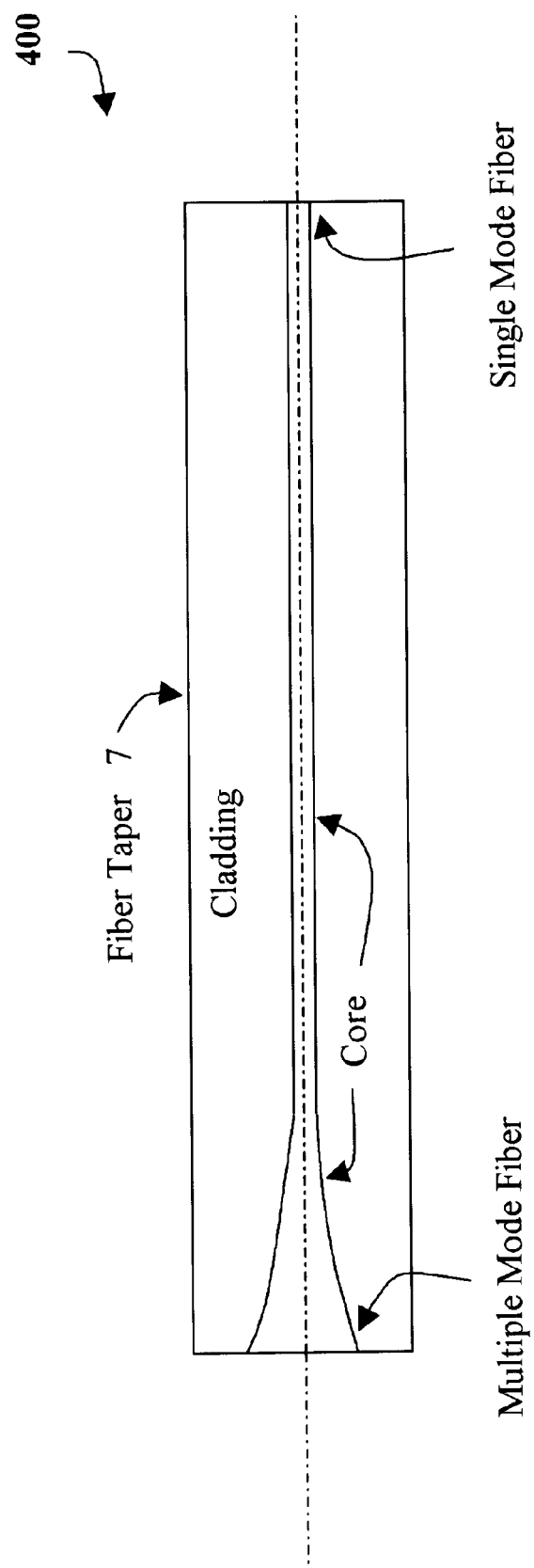
FIG. 4 is the schematic of a fiber taper.

The input end of the fiber taper 7 shown in FIG. 4 is a multiple mode (MM) fiber while its output end is a single mode (SM) fiber. The diameters of their claddings are the same, being 125 micrometers typically. The core diameter at the MMF end is about 30–50 micrometers, gradually decreasing to be about 9–12 micrometers over several millimeters along the fiber axis to become a SM fiber. In other words, the taper is basically a SM fiber, except over a short length (of several millimeters) around one end (being a MM fiber). Although the length of the fiber taper can be much shorter than one meter, the convenient length of the fiber taper should be about 1–2 meters. Thus, the fiber taper can be readily used as the output fiber pigtail for the optical isolator.

Figure 5:
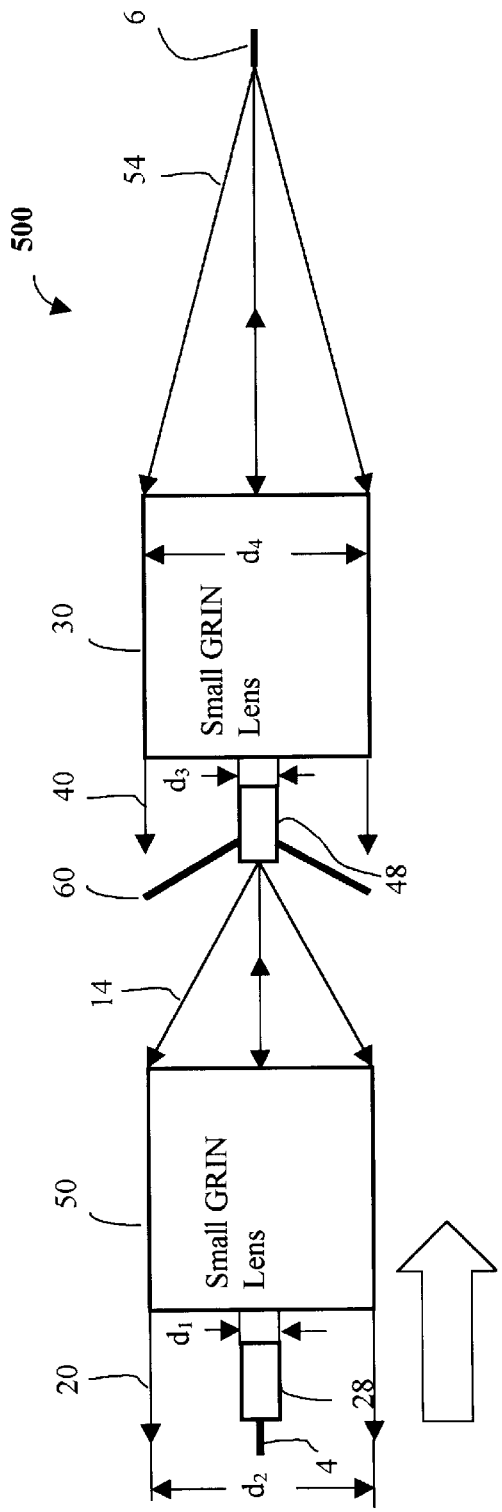
FIGS. 5–8 are the schematics of two-stage fiber in-line isolators based on various combinations of the single-stage isolators shown in FIG. 1 and FIG. 2.
Figure 6:
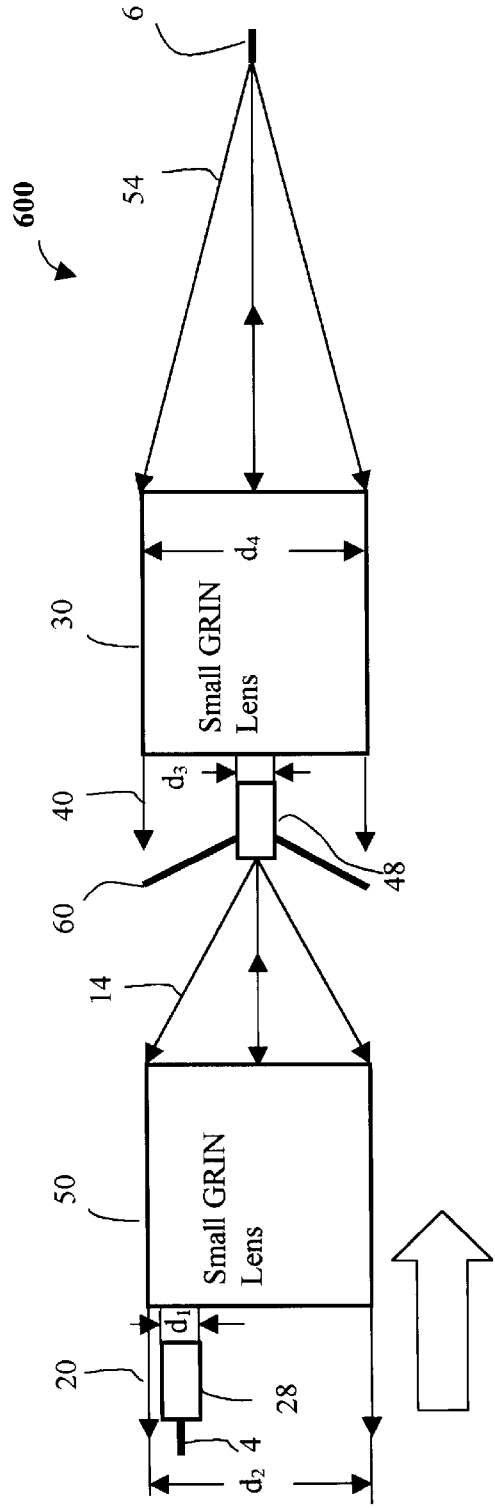
Figure 7:
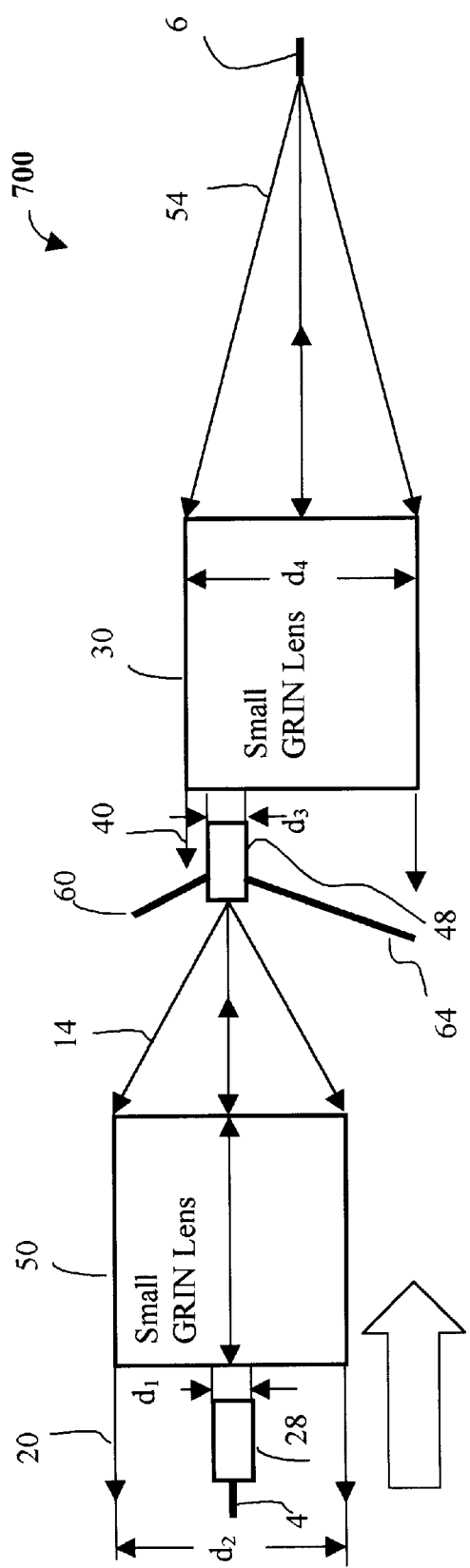
Figure 8:
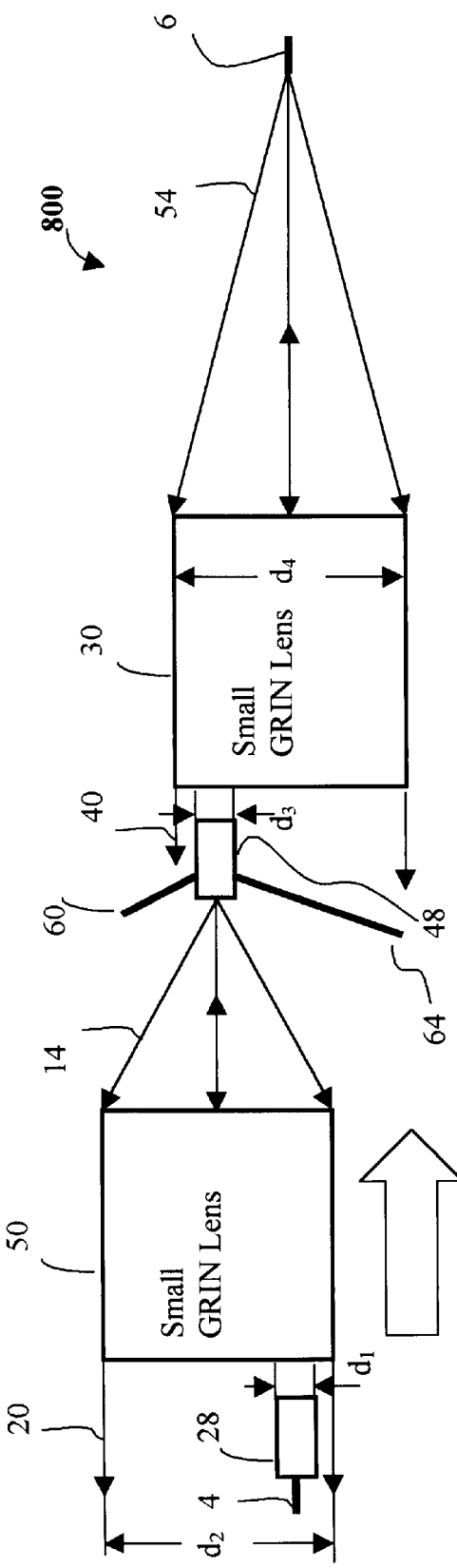

The single stage isolators shown in FIGS. 1–3 can be expanded into two-stage ones as shown in FIGS. 5–8. The Grin lenses 50 and 48 have a pitch of 0.11 and 0.25, respectively. The two-stage isolator has much larger isolation, but with a higher insertion loss and a longer length. The isolation for the two-stage isolators shown in FIGS. 5–8 is given by $$\text{Iso} = 10 \text{ Log}_{10}[K_1 K_2 (d_2/d_1)^2 (d_4/d_3)^2], \quad (3)$$

where usually $d_1 = d_3$ and $d_2 = d_4$, $K_{1,2} < 1$ for FIG. 5, $K_1 > 1$ and $K_2 < 1$ for FIG. 6, $K_1 < 1$ and $K_2 > 1$ for FIG. 7, and $K_{1,2} > 1$ for FIG. 8. Using the similar values as used previously for Equation 2, it is obvious that isolation (Iso) is very much enhanced and can be in the range of 70–90 dB. Among them, the isolation in FIG. 8 is the largest. A multiple stage isolator (N>2) may be constructed similarly, but in general it is unnecessary.

For convenience, the isolators 100, 200 and 300 shown in FIGS. 1–3 can be thought as consisting of an input collimator and an output collimator. The input collimator comprises the input fiber 4 and the micro Grin lens 28, while the output collimator comprises the output fiber 6 and the small Grin lens 30. In manufacturing of a collimator, a fiber capillary tube is used to fix the fiber, and a glass tube is used as the housing of the collimator. The fabrication of such a collimator is quite simple, and has become common knowledge and been standardized in the fiber component industry. Many fiber component manufacturers such as JDS FITEL and E-Tek Dynamics have sold fiber collimators as an independent product.

The output fiber 6 (or the input fiber 4) has a small numerical aperture (for instance, about 0.11–0.13 radians for Corning single mode fibers SMF-21 and SMF-28) and the Gaussian beam emanating from it has a small waist (about 9–12 micrometers). To reduce the length of the isolator, another small Grin lens may be inserted between the small Grin lens 30 and the output fiber 6 shown in FIG. 1 or FIG. 2. Contrary to a SELFOC lens, the refractive index of this Grin lens increases along the radial direction. Like a conventional concave lens, this GRIN lens can significantly diverge the beam. However, it increases the dispersion. Together these two lenses act as a more effective beam expander for the backward-going Gaussian beam.

The micro collimator shown in FIGS. 1–2 can be attached to the small Grin lens 30. In FIGS. 5–8, the micro collimator can be attached to the small Grin lens 50 and the micro Grin lens 48 can be attached to the small Grin lens 30. These arrangements will increase the mechanical strength of the isolator. Using plano-concave small Grin lenses 30 and 50 or a single mode fiber with a larger numerical aperture as the output fiber, the overall length of an isolator can be reduced.

In fabricating this type of isolators, only a very small area (around 0.13 mm² or less) of the input and output surfaces of the small Grin lenses 30 and 50 in which the forward-going beam propagates needs to be polished and/or coated with anti-reflection players. Thus, the light-diffusing plates 60 and 64 shown in FIGS. 5–8 may not be required.

The components of the isolators 100–800 shown in FIGS. 1–8 are all in the form of a cylinder, except the light-diffusing plates 60 and 64 shown in FIGS. 5–8. And the structures of the isolators are simple. It is unnecessary to show the cross-section view (except FIG. 3b), since they all have a circular cross section.

Compared with the current in-line isolator, this type of optical isolators (which can be called a "coreless" isolator) has the following advantages:

1) A much simpler structure and uses only a few simple components (Grin lenses).
2) Lower overall cost, due to fewer parts, easier fabrication and a faster assembly time.
3) Higher reliability.
4) Broadband [850–1050 nm (nanometer), 1450–1650 nm]. An isolator at 980 nm with smaller dimensions than that of the current one can be made.
5) Virtually polarization dependent loss (PDL) and polarization mode dispersion (PMD) free, because the input beam is not divided into two orthogonally polarized beams.

The beam aperture and offset beam aperture methods (or called the unequal beam aperture method) can be used to make polarization-independent in-line isolators for multiple mode fibers. In this type of isolator, the input and output parts are multiple mode fibers which have a larger core (with a diameter of 25 to 200 micrometers) than that of a single mode fiber.

The isolators described here are all in-line isolators. That is, they are connected directly to transmission fibers in telecommunications networks. By adding a couple of micro and small Grin lenses, this in-line isolator can become a free space (or called air-path) one whose input and output beams are usually collimated beams with an aperture of several millimeters. The central wavelengths of the in-line isolators are in the IR region such as 980, 1300, 1310, 1480, 1540, and 1550 nm. The region of the central wavelengths of the free space isolators is wider, including IR, visible light and UV (ultraviolet).

What I claim as my invention is:

1. An optical isolator comprising in combination:
   a micro collimator;
   a small collimator;
   said micro collimator being positioned at the axis of said small collimator;
   said micro collimator including:
      a first fiber for providing the input beam; and
      a micro GRIN lens for collimating the input beam from said first fiber; and
   said small collimator including:
      a second fiber for the output beam and the backward-going beam; and
      a small GRIN lens for focusing the forward-going beam into said second fiber.

2. The isolator according to claim 1, wherein said micro GRIN lens in said micro collimator is replaced with a second small GRIN lens having 0.25 pitch whose length is much smaller than that of said first small GRIN lens in said small collimator, and the divergent forward-going beam from said first fiber becomes collimated with a small beam width of 0.04–0.2 mm due to said second small GRIN lens, and being focused by said small collimator into said second fiber with a minimal loss of beam power, while the divergent backward-going beam from said second fiber are expanded and becomes collimated with a relatively large beam width of 2–8 mm due to said small collimator, and being focused by said second small GRIN lens into said first fiber with a significant loss of total beam power.

3. An optical isolator comprising in combination:
a micro collimator;
a small collimator;
said micro collimator being positioned off-axis of said small collimator;
said micro collimator including:
   a first fiber for providing the input beam; and
   a micro GRIN lens for collimating the input beam from said first fiber; and
said small collimator including:
   a second fiber for the output beam and the backward-going beam; and
   a small GRIN lens for focusing the forward-going beam into said second fiber.

4. An optical isolator comprising in combination:
a micro collimator;
a small collimator;
said micro collimator being positioned off-axis and placed in a slot of said small
collimator;
said micro collimator including:
   a first fiber for providing the input beam; and
   a micro GRIN lens for collimating the input beam from said first fiber; and
said small collimator including:
   a second fiber for the output beam and the backward-going beam; and
   a small GRIN lens having 0.5 pitch with a circumferential narrow slot of half of its length for focusing the forward-going beam into said second fiber.

5. The isolators according to claim 1, 3 or 4, wherein the forward-going beam from said first fiber becomes collimated at the output surface of said micro GRIN lens with a small beam width of 0.04–0.2 mm due to said micro collimator, and being focused by said small collimator into said second fiber with a minimal loss of power.

6. The isolators according to claim 1 or 3, wherein the backward-going beam from said second fiber are expanded and becomes collimated with a relatively large beam width of 2–8 mm due to said small collimator, and being focused by said micro collimator into said first fiber with a significant loss of total beam power.

7. The isolator according to claim 4, wherein the backward-going beam from said second fiber are expanded and becomes collimated around the half length having 0.25 pitch of said small collimator with a relatively large beam width of 2–8 mm due to said small collimator, and being focused by said micro collimator into said first fiber with a significant loss of total beam power.

8. The isolator according to claim 2, wherein the forward-going beam from said first fiber becomes collimated at the output surface of said second small GRIN lens with a small beam width of 0.04–0.2 mm due to said second small collimator, and being focused by said first small collimator into said second fiber with a minimal loss of power.

9. The isolator according to claim 2, wherein the backward-going beam from said second fiber are expanded and becomes collimated with a relatively large beam width of 2–8 mm due to said first small collimator, and being focused by said second small collimator into said first fiber with a significant loss of total beam power.

10. An optical isolator comprising in combination:
a micro collimator;
a small collimator;
a second small GRIN lens;
a second micro GRIN lens;
two light-diffusing plates;
said two collimators and said two second GRIN lenses being positioned at the same axis;
said micro collimator including:
   a first fiber for providing the input beam; and
   a first micro GRIN lens for collimating the input beam from said first fiber; and
said small collimator including:
   a second fiber for providing the output beam or the backward-going beam; and
   a first small GRIN lens for collimating the backward-going beam from said second fiber
   and focusing the collimated forward-going beam from said second micro GRIN lens into said second fiber.

11. An optical isolator comprising in combination:
a micro collimator;
a small collimator;
a second small GRIN lens;
a second micro GRIN lens;
two light-diffusing plates;
said micro collimator being positioned at an off-axis position;
said micro collimator including:
   a first fiber for providing the input beam; and
   a first micro GRIN lens for collimating the input beam from said first fiber; and
said small collimator including:
   a second fiber for providing the output beam or the backward-going beam; and
   a first small GRIN lens for collimating the backward-going beam from said second fiber
   and focusing the collimated forward-going beam from said second micro GRIN lens into said second fiber.

12. An optical isolator comprising in combination:
a micro collimator;
a small collimator;
a second small GRIN lens;
a second micro GRIN lens;
two light-diffusing plates with different sizes;
said micro collimator, said second small GRIN lens, and said second micro GRIN lens being positioned at the central axis;
said small collimator being positioned off-axis;
said micro collimator including:
   a first fiber for providing the input beam; and
   a first micro GRIN lens for collimating the input beam from said first fiber; and
said small collimator including:
   a second fiber for providing the output beam or the backward-going beam; and
   a first small GRIN lens for collimating the backward-going beam from said second fiber
   and focusing the collimated forward-going beam from said second micro GRIN lens into said second fiber.

13. An optical isolator comprising in combination:
a micro collimator;
a small collimator;

a second small GRIN lens;

a second micro GRIN lens;

two light-diffusing plates with different sizes;

said micro collimator and said small collimator being positioned at the same central axis;

said second small GRIN lens, and said second micro GRIN lens being positioned off-axis;

said micro collimator including:
    a first fiber for providing the input beam; and
    a first micro GRIN lens for collimating the input beam from said first fiber; and said small collimator including:
    a second fiber for providing the output beam or the backward-going beam; and
    a first small GRIN lens for collimating the backward-going beam from said second fiber and focusing the collimated forward-going beam from said second micro GRIN lens into said second fiber.

14. The isolators according to claim 10, 11, 12, 13, wherein the forward-going beam from said first fiber becomes collimated at the output surface of said first micro GRIN lens with a small beam width of 0.04–0.2 mm due to said micro collimator, and being focused by said second small GRIN lens into said second micro GRIN lens, and becoming collimated by said second micro GRIN lens, and being focused by said small collimator into said second fiber with a minimal loss of power.

15. The isolators according to claim 10, 11, 12 or 13 wherein the backward-going beam from said second fiber are expanded and becomes collimated at the output surface of said small collimator with a relatively large beam width of 2–8 mm due to said small collimator, and being focused by said second micro GRIN lens, being expanded and becoming collimated at the output surface of said second small GRIN lens with a relatively large beam width of 2–8 mm, and being focused by said micro collimator into said first fiber with a significant loss of total beam power.

16. The isolators according to any claim 1, 2, 3, 4, 10, 11, 12, or 13, wherein only a very small area of the input and output surfaces of said small GRIN lenses in which the forward-going beam propagates needs to be polished and/or coated with anti-reflection players.

17. The isolators according to any claim 1, 2, 3, 10, 11, 12, or 13, wherein a small GRIN lens having an increasing refractive index along its radial direction is inserted between said first small GRIN lens and said output fiber, and between said second small GRIN lens and said second micro GRIN lens.

18. The isolator according to any claim 1, 2, 3, 10, 11, 12, or 13, wherein a pitch of said first and second small GRIN lenses is changed from 0.11 to 0.25, and the output face of said first small GRIN lens and the input side of said output fiber should be in contact, and the output face of said second small GRIN lens and the input face of said second micro GRIN lens should be in contact.

19. The isolator according to claim 18, wherein said output fiber is replaced with a fiber taper whose core diameter at the input side decreases gradually from 30–50 micrometers to 9–12 micrometers over a fiber length of several millimeters.

20. The isolator according to any claim 1, 2, 3, 10, 11, 12, or 13, wherein said output fiber is replaced with said fiber taper whose core diameter at the input side decreases gradually from 30–50 micrometers to 9–12 micrometers over a fiber length of several millimeters.

\* \* \* \* \*